United States Patent [19]
Wegner et al.

[11] Patent Number: 6,032,192
[45] Date of Patent: Feb. 29, 2000

[54] PRO-ACTIVE MESSAGE DELIVERY SYSTEM AND METHOD

[75] Inventors: Martin T. Wegner, Barrington; Omprasad S. Nandyal, Bloomingdale, both of Ill.; Antonio Dutra, Buffalo, N.Y.; Randy Storch, Highland Park, Ill.

[73] Assignee: Open Port Technology, Inc., Chicago, Ill.

[21] Appl. No.: 09/013,787

[22] Filed: Jan. 26, 1998

Related U.S. Application Data

[63] Continuation of application No. 08/582,475, Jan. 4, 1996, Pat. No. 5,712,907, which is a continuation of application No. 08/529,923, Sep. 18, 1995, abandoned.

[51] Int. Cl.⁷ ..................................................... G06F 13/00
[52] U.S. Cl. .......................... 709/238; 709/206; 709/241; 709/300
[58] Field of Search .................................... 709/201, 202, 709/203, 206, 217, 218, 219, 220, 223, 224, 238, 239, 240, 241, 242, 250, 300; 379/89, 93.08, 100.01, 100.08, 100.09

[56] References Cited

U.S. PATENT DOCUMENTS

| | | |
|---|---|---|
| 4,207,598 | 6/1980 | Reich et al. . |
| 4,410,765 | 10/1983 | Hestad et al. . |
| 4,594,477 | 6/1986 | Noirot . |
| 4,788,721 | 11/1988 | Krishnan et al. . |
| 4,901,341 | 2/1990 | Carter et al. . |
| 4,918,722 | 4/1990 | Duehren et al. . |
| 4,972,464 | 11/1990 | Webb et al. . |
| 4,994,926 | 2/1991 | Gordon et al. . |
| 5,014,300 | 5/1991 | Harvath et al. . |
| 5,131,024 | 7/1992 | Pugh et al. . |
| 5,142,570 | 8/1992 | Chaudhary et al. . |
| 5,247,591 | 9/1993 | Baran ...................................... 382/179 |
| 5,289,536 | 2/1994 | Hokari . |
| 5,291,302 | 3/1994 | Gordon et al. . |
| 5,337,352 | 8/1994 | Kobayashi et al. . |
| 5,369,686 | 11/1994 | Dutra et al. . |
| 5,400,395 | 3/1995 | Berenato . |
| 5,404,231 | 4/1995 | Bloomfield . |
| 5,406,557 | 4/1995 | Baudoin . |
| 5,406,643 | 4/1995 | Burke et al. ............................. 709/243 |
| 5,414,754 | 5/1995 | Pugh et al. . |
| 5,425,085 | 6/1995 | Weinberger et al. . |
| 5,459,584 | 10/1995 | Gordon et al. . |
| 5,473,630 | 12/1995 | Penzias et al. . |
| 5,481,604 | 1/1996 | Minot . |
| 5,509,061 | 4/1996 | Amereller et al. . |
| 5,521,910 | 5/1996 | Matthews . |
| 5,550,910 | 8/1996 | DeJager . |
| 5,570,417 | 10/1996 | Byers . |
| 5,608,786 | 3/1997 | Gordon . |
| 5,764,741 | 6/1998 | Barak . |

OTHER PUBLICATIONS

Data CommunicationsMagazine, "A Private Path for Corporate Faxes", McGraw Hill, Inc. (Jan. 21, 1994).
Brooktrout Technology, TR114 Universal Fax/Voice Card Technical Specifications (1994).
NetXchange Communications Ltd., "Corporate Fax Exchange," 1996.
Davidson Consulting, "NetFax News, Fax Services, Switches, and Enterprise Fax" (May, 1994).

*Primary Examiner*—Viet D. Vu
*Attorney, Agent, or Firm*—Crowell & MoringLLP

[57] ABSTRACT

A pro-active message delivery system which routes digitally-encoded messages via public-switched telephone networks and wide area networks to most cost-effectively deliver the messages, subject to security, privacy, and availability considerations. In a preferred embodiment of the invention, digitally encoded messages entered into a wide area network, either directly or via a public-switched telephone network, are sent to their destination using the most cost-effective route, by calculating the cost of sending the message via the available routes, and selecting the lowest cost route. Generally, the lowest cost route might use the node on the wide area network closest to the recipient of the message, or might use or node located in an area which charges off-peak rates at the time of transmission.

9 Claims, 7 Drawing Sheets

PRO-ACTIVE MESSAGE DELIVERY SYSTEM AND METHOD

This application is a continuation of application Ser. No. 08/582,475, filed Jan. 4, 1996, now U.S. Pat. No. 5,712,907 which is a continuation of application Ser. No. 08/529,923, filed Sept. 18, 1995, now abandoned.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The portion subject to copyright protection has been defined by placing one copyright notice just prior to the beginning of the copyrighted portion, and placing a second copyright notice just after the end of the copyrighted portion.

BACKGROUND

1. Field of the Invention

The present invention relates to systems and methods for cost-efficient routing of digitally encoded messages using, as appropriate, private networks and public-switched telephone networks.

2. Background of the Invention

FIG. 1 is a schematic diagram of a prior art point-to-point delivery system for digitally encoded message (DEM) data. Message communicating device (MCD) 1 uses public-switched telephone network (PSTN) 3, which provides a direct path from MCD 1 to PSTN 3 through connection 10. PSTN 3 then establishes connection 30 to MCD 5, creating an end-to-end connection between MCD 1 and MCD 5, such that MCD 1 can transmit the DEM data to MCD 5. In the reverse direction, MCD 5 can establish connection 70 to PSTN 3, which then establishes connection 90 to MCD 1, and again the DEM data is transmitted to MCD 1.

FIG. 2 is a schematic diagram of a second prior art message delivery system. In this system, MCD 1 uses a Store-and-forward Message Handler (SFMH) 4, which can provide send-side service (store-and-forward functionality), receive-side service (mailbox functionality), or both, to MCD 1. When MCD 1 sends a DEM to MCD 5, MCD 1 establishes connection 10 to PSTN 3, as in the prior art system of FIG. 1. However, PSTN 3 then establishes a connection 41 to SFMH 4 (instead of directly to MCD 5). The DEM data is then transferred from MCD 1 to SFMH 4, and stored electronically by SFMH 4. Connection 41 is no longer needed. After connection is discontinued, SFMH 4 is charged with forwarding the same DEM data to MCD 5, through connections 51 and 31.

In the reverse direction, SFMH 4 can receive DEM data addressed to MCD 1 from MCD 5. The first transmission is made by MCD 5 to SFMH 4 using connections 70 and 42. SFMH 4 then stores the DEM data, and either:

(1) awaits pickup from MCD 1—in which case MCD 1 initiates pickup through connection 13 to PSTN 3, which creates connection 43 to SFMH 4; or (2) pro-actively calls MCD 1 through connections 51 and 11, and the DEM data is transmitted from SFMH 4 to MCD 1.

The prior art system of FIG. 2 can lower costs by deferring delivery of low-priority long-distance messages until rates are lower, and can also make repeated attempt to deliver the DEM. However, the system can provide cost efficient store and deliver or mailbox services to only one side, e.g., to MCD 1, because the other side would have to pay for long-distance rates to use the SFMH.

FIG. 3 is a schematic diagram of another prior-art system, in which two SFMHs are used to minimize telephone costs. PSTN 3 in FIGS. 1 and 2 was defined as a single entity, because all telephone calls are made to and from the PSTN located nearest to MCD 1 (in FIG. 1) or SFMH 4 (in FIG. 2). FIG. 3 shows a PSTN 3a which has the same relationship to SFMH 8a as PSTN 3 has to SFMH 4 in the FIG. 2. However, this system also includes PSTN 3b, which is the PSTN located nearest to SFMH 8b.

In this system, MCD 1 establishes connections 10 and 41 through PSTN 3a, and the message is transferred to and stored on SFMH 8a. PSTN 3a in this case is local to MCD 1, but not to MCD 5 (otherwise the message could just as well have been sent directly to MCD 5 from PSTN 3a). This system uses connection 49 between SFMH 8a and SFMH 8b, instead of long-distance connection 31 of FIG. 2. Connection 49 is a long-distance data connection that can be conducted at speeds far greater than the speeds that can be provided by an ordinary long-distance PSTN connection. In this case, SFMHs 8a and 8b are nodes in the transmission system, and connection 49 is a high-speed inter-nodal connection. Finally, connection 32 is local to MCD 5, such that its cost will be substantially lower than the costs of the long distance connections used in the system shown in FIGS. 1 and 2.

FIG. 4 represents a typical electronic mail (E-mail) system. Inter-nodal connection 49 is referred to as a gateway between the SFMHs. The problem with such E-mail systems is that such gateway networks have been developed for only one specific DEM data type, in which free-form text is represented by the ASCII character set.

FIG. 5 is a schematic diagram of a system disclosed in U.S. Pat. No. 5,369,686, which is hereby incorporated by reference. In the system of FIG. 5, an Enhanced Service Exchange Device ESX 2 is placed between MCD 1 and PSTN 3. The user of MCD 1 simply inputs only the address, e.g., the telephone number, of MCD 5. ESX 2 receives the address and the DEM over connection 11, and then establishes telephone connection 10 and 41 to SFMH 4, via PSTN 3.

DEFINITIONS

"DEM," as used herein, shall mean digitally encoded message.

"MCD," as used herein, shall mean message communicating device. A facsimile machine is one example of an MCD.

"Postscript," as used herein, refers to a specific formatting method for encoding information to be printed, originally described by Adobe Systems. It is currently in widespread general use.

"PCL," as used herein, refers to a specific method for encoding information to be printed, as originally described by the Hewlett-Packard Corporation. It is currently in widespread general use.

"PSTN," as used herein, shall mean public-switched telephone network.

"TIFF," as used herein, shall mean tagged image file format.

"WAN," as used herein, shall mean wide area network.

SUMMARY OF THE INVENTION

The present invention is a pro-active delivery (PROAD) system and method for the delivery of digitally-encoded messages, optimized for pro-active delivery. In the present invention, the message content can be in any one of many manipulable formats. The pro-active message delivery system uses various criteria to route the message such that it is delivered through the most-cost-efficient route. If available, the PROAD system uses wide-area networks ("WANs") to minimize the cost of message communication, and to improve the security, reliability, privacy and ease-of-use of the DEM. However, the present invention can be implemented without the use of a WAN, if transmission via another system is more cost-effective, or is not indicated for other reasons. The terms "wide-area network" and "WAN," as used hereinafter, shall include both wide-area networks and other cost-effective systems for transmitting DEM data.

FIG. 6 is a schematic diagram of a preferred embodiment of the present invention. The left side of FIG. 6 identifies the potential parties on the "send" side of the PROAD network: MCD 1s, connected directly to PSTN 5s; MCD 2s connected to PSTN 5 through call re-router 4s; and Network User 3s, connected to network node 6s. The right side identifies potential parties that could receive DEM data through the PROAD network: MCD 1r, connected to PSTN 5r; MCD 2r connected to network node 6r; and Network User 3r, connected to network node 6r. PSTN 5s is the telephone network local to the sender, and PSTN 5r is the telephone network local to the receiver. WAN 6 has at least two network nodes 6s and 6r.

DEM data are entered into WAN 6 either through PSTN 5s using either MCD 1s or MCD 2s (via Call Re-router 4s), or using a direct connection to WAN 6 at Network Node 6s by MCD 2s (again via Call Re-router 4s) or Network User 3s. Messages are directly received by Network Node 6s from these entry points and temporarily stored pending distribution.

DEM data input by Network User 3s can be manipulated to optimize message handling requirements, such that network usage between Network User 3s and Network Node 6s is minimized. DEMs are re-formatted such that they can be most efficiently used in further pro-active delivery actions by Network Node 6s.

FIG. 7a is a schematic block diagram of a Network Node. Sender 8s, which may be MCD 1s, MCD 2s or Network User 3s, generates DEM data which enters Network Node 87 via Message Insertion Interface 101. The recipient's address is analyzed by Least Cost Routing Processor 103. If Least Cost Routing Processor 103 determines that the delivery should be made from the same Network Node 87, the address is passed to Direct Delivery Processor 113, which determines if the recipient is a Network User or an MCD. Message Delivery Interface 115 then determines the final delivery route to Recipient 8r, and delivers the message to Recipient 8r (or notifies Recipient 8r that a message is waiting to be picked up).

If the Least Cost Routing Processor determines that the most cost-effective delivery is via another Network Node 88, the DEM is passed on to Network Delivery Compressor 105 for intra-network character count minimization. Network Delivery Router 107 then communicates with Network Node 88, through Network Node 88's Network Delivery Receiver 109. A Network Receipt Decompressor 111 in Network Node 88 decompresses the DEM. The address of Recipient 9r is passed on to a Direct Delivery Processor 113 in Network Node 88, and it delivers the DEM through a Message Delivery Interface 115 in Network Node 88 to Recipient 9r.

Network Node 87 may be implemented using, e.g., a personal computer or a mid-range computer, having the appropriate software modules which carry out the individual functions shown in FIG. 7a.

A PROAD system located, for example at Network Node 6s, is fully responsible for delivering the DEMs, as opposed to the case of a voice mail system, for example, where the message would wait to be picked up by the recipient. Network Node 6s could decide to deliver the message back through PSTN 5s to MCD 1r, if that recipient is best dialed (or can only be dialed) from this same PSTN entry point. In that case, the present invention would not offer a significant advantage, beyond re-formatting the DEM.

Network Node 6s first determines that Network Node 6r is the optimal node on WAN 6 from which to deliver the message to its intended recipient. Network Node 6s then determines the optimal route and format for delivering the message, using a combination of public telephone networks, and private or governmental networks.

Network node 6s places the message in a format which minimizes the use of network bandwidth between Network Nodes 6s and 6r. The chosen format (or compressed representation of the DEM) can be different for DEM data entered by MCD 1s or MCD 2s (which is probably already in image format), compared to that entered by Network User 3s, which can be in a message content format (e.g., Postscript) optimal for local computer-generated DEM data. Network node 6s may also select a format that minimizes the risk of a security breach.

Network Node 6s may be the optimal node from which to deliver the message. In this case, Network Node 6s and Network Node 6r are the same physical entity, and the advantages of inter-nodal optimization as described in the previous paragraphs do not apply.

If the intended recipient is MCD 1r (e.g., if the message is input by Network User 3r or MCD 2s), the present invention offers no additional advantages over the prior art (except for the data compression and encryption options discussed below). If the intended recipient is MCD 2r, which can be reached via a direct connection, the present invention makes available a cost savings by avoiding the phone call normally required in a pro-active delivery system.

If the intended recipient is Network User 3r, the message transfer is roughly equivalent to that of existing E-mail systems, but the present invention adapts the benefits of passive E-mail transfer to message content that normally requires pro-active delivery. As such, the present invention differs from prior art E-mail systems by (1) encoding data for minimal network bandwidth usage (between Network Node 6r and Network User 3r); (2) identifies non-conversion or conversion possibilities when the sender is Network User 3s; and (3) provides a mechanism for the private receipt of DEM data.

Network nodes 6s and 6r may be on an organization's existing WAN, or may be available to an organization through connections external to the organization's existing WAN, or may be provided as a value-added network alternative.

The pro-active delivery (PROAD) network of the present invention is different from E-mail networks in two respects. First, the message content is encoded in image format, which is significantly different from text-based E-mail messages. The manipulation of image-encoded messages is more robust, offering greater variation in the possible delivery methods. For example, a facsimile-based message delivery network delivers a message that, per page, is ten times the size of an E-mail message. To minimize the impact of the size of the messages, the PROAD network generates facsimile messages in a format that can be optimally condensed. This minimizes the use of the network bandwidth when messages must travel between network nodes.

Second, E-mail systems are passive systems which collect messages for pick-up by the recipient. The PROAD network actively delivers the message to the recipient. Further, since that recipient need not be a member of the E-mail network, accommodations must be made for delivery to the variations in receiving equipment. The economics of such a system differ greatly from E-mail systems, in that the final delivery step is often the most significant cost component for the system provider. As such, the PROAD network routes messages, based on sophisticated least-cost routing rules, to the network node that (a) is capable of delivering the facsimile to the intended recipient and (b) can deliver that facsimile most cost effectively.

Accordingly, the PROAD network of the present invention performs the following key tasks:

Least-cost routing: The PROAD network employs a least-cost routing algorithm that places the message on the network node where the phone call (if needed) to the message recipient is least costly (compared to prior art systems which merely use the network node closest to the message recipient). The least-cost routing algorithm can also be used as a preferred-path routing algorithm. This algorithm takes into account the costs and characteristics of the WAN as well as the cost of the final telephone call to the recipient. For example, while it may be optimal (in terms of the final telephone call) to deliver a message from a node in Chicago, the network bandwidth to Chicago may be more costly or less available. A cost can be allocated to the WAN usage, such that the true optimal path may be to deliver the message to a network node in Indianapolis, and then make the long-distance telephone call to Chicago.

Image file message size minimization: The PROAD network offers message compression options to minimize the impact of the message size on the network usage. Since the character count of an image file containing the average facsimile message is approximately 135,000 bytes, this can be a very significant factor in reducing the cost of communicating DEMs.

Message creation and inter-nodal transfer, size minimization: The presence of network users directly connected to the PROAD network (instead of requiring access through PSTN dial-up), offers additional opportunities for efficient message handling. In some embodiments of the present invention, the PROAD network need not define the message content format until the point of delivery. For example, in a facsimile network, the representation of a facsimile document is typically in tagged image file format (TIFF). The industry average for a facsimile page in TIFF format is 45,000 characters. If a network user is generating the document to be transmitted via facsimile using a particular software package, and the output of that software package can eventually be converted to TIFF, significant gains are made if the output of the software package produces an equivalent page size of less than 45,000 characters. As one example, the average per page output of a document in Postscript format is half that figure.

Furthermore, this message creation enhancement also improves the effects of image compression. The average compression of a TIFF file is 15–20%, whereas the average compression of a Postscript file is 30–35%. Combining the output improvement and the compression improvement, the net size of an equivalent facsimile page can be reduced to 15,000 characters on average. This results in a 3-fold savings on the usage of network bandwidth when the initiating DEM data sender is a network user.

"Blind" inter-nodal transfer among network users: When the recipient of DEM data is also a network user, there is an obvious advantage in delivery, in that the PSTN—and its associated charges—is not needed. With DEM data that must be pro-actively delivered, senders do not have to be aware that recipients are network users. When both the sender and receiver are network users, the routing mechanism can eliminate all PSTN costs, without either party having to know that the other is also a network user.

When the recipient is also a network user, the PROAD network is often aware of various characteristics of the recipient's workstation. For example, the PROAD network may maintain a listing of message content formats that a particular recipient can support. It is therefore possible for the PROAD network to map sender-generated message content formats to receiver-acceptable message content formats. For example, a WordPerfect file could be sent to a WordPerfect user in WordPerfect format. In that case, the conversion to an image format (e.g., TIFF in the facsimile example) is eliminated, since the WordPerfect format is likely to require a smaller message size than any image format. Moreover, the recipient can edit the received message, whereas that would otherwise not readily be available if the DEM is sent using an image format.

Security and privacy: The PROAD network can eliminate security concerns typical of pro-active delivery mechanisms, especially those that must use the PSTN for delivery. When the DEM data is transmitted through the WAN, rather than through a PSTN, the data is secure if the WAN is secure. Even if there is a breach of the data network, the data compression techniques discussed above can prevent casual observers from reading the DEM data. Further, encryption techniques can be applied to the compressed data much more readily, i.e., the encryption can be integrated into the compression process.

The most likely location of a security breach is in the PSTN line at the particular location of the message entry point or at the point of last delivery. In the PROAD network, if either party is a network user, the transfer of DEM data from the user to the network node, or vice versa, is conducted using a proprietary file transfer mechanism. This eliminates the potential for breach at the point of entry or at the point of last delivery.

Also, if the recipient is a network user, additional benefits are gained in privacy. In a typical pro-active delivery situation, the message is delivered to a phone number, usually connected to a device. The output of that device is typically not secure, in that casual observers other than the intended recipient may have the opportunity to view the output. This is a fairly common complaint about facsimile and facsimile machines, for example. The present invention overcomes this limitation by applying E-mail-like access constraints to a PROAD network, such that DEM data intended for a particular network user can only be viewed by that user.

These and other objects of the present invention are described in greater detail in the detailed description of the invention, the appended drawings and the attached claims.

DETAILED DESCRIPTION OF A PREFERRED EMBODIMENT OF THE INVENTION

Figure 6:
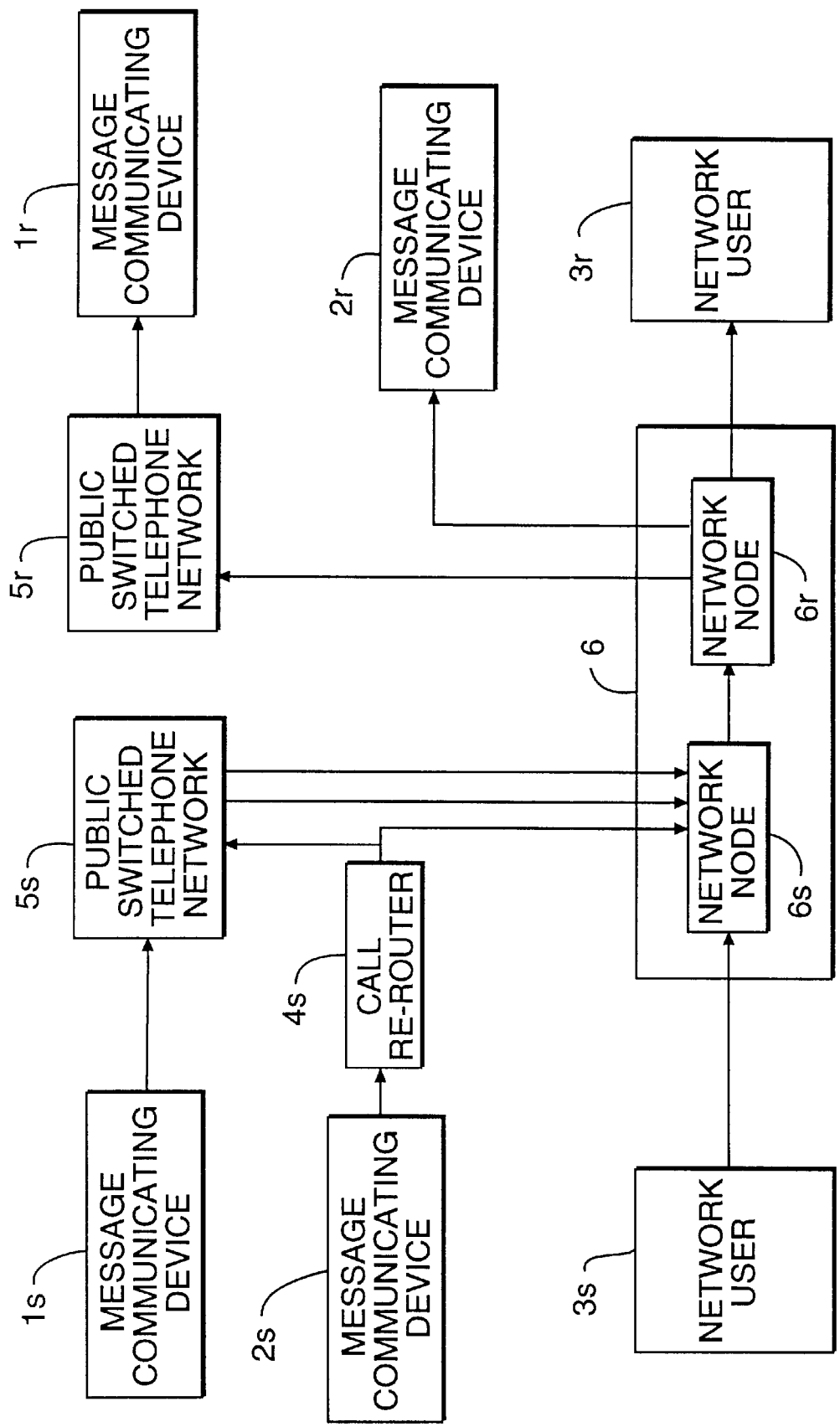
FIG. 6 is a schematic diagram of a preferred embodiment of the present invention, showing two network nodes in a wide area network.
Figure 7:
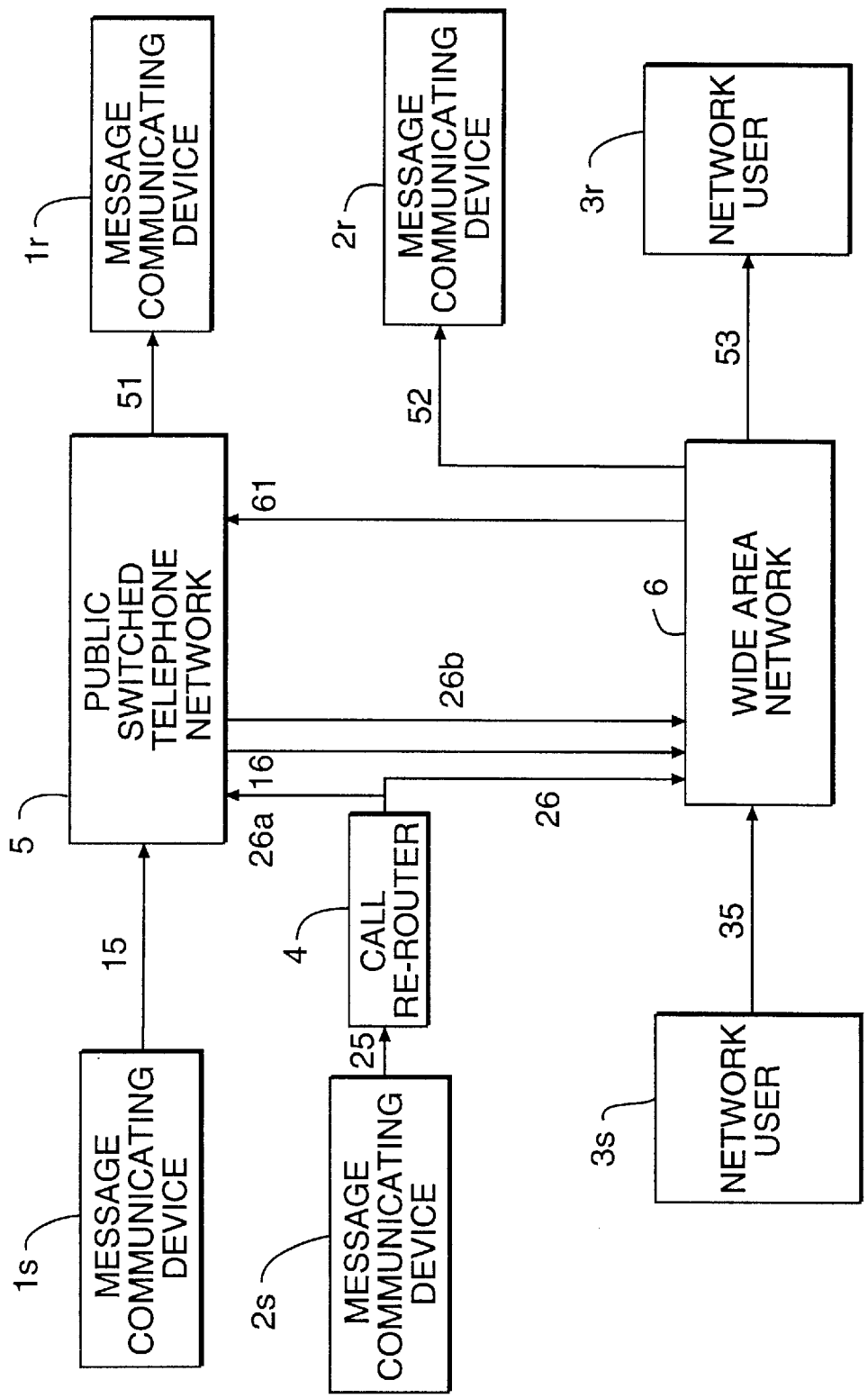
FIG. 7 is a schematic diagram of a preferred embodiment of the present invention.
Figure 7A:
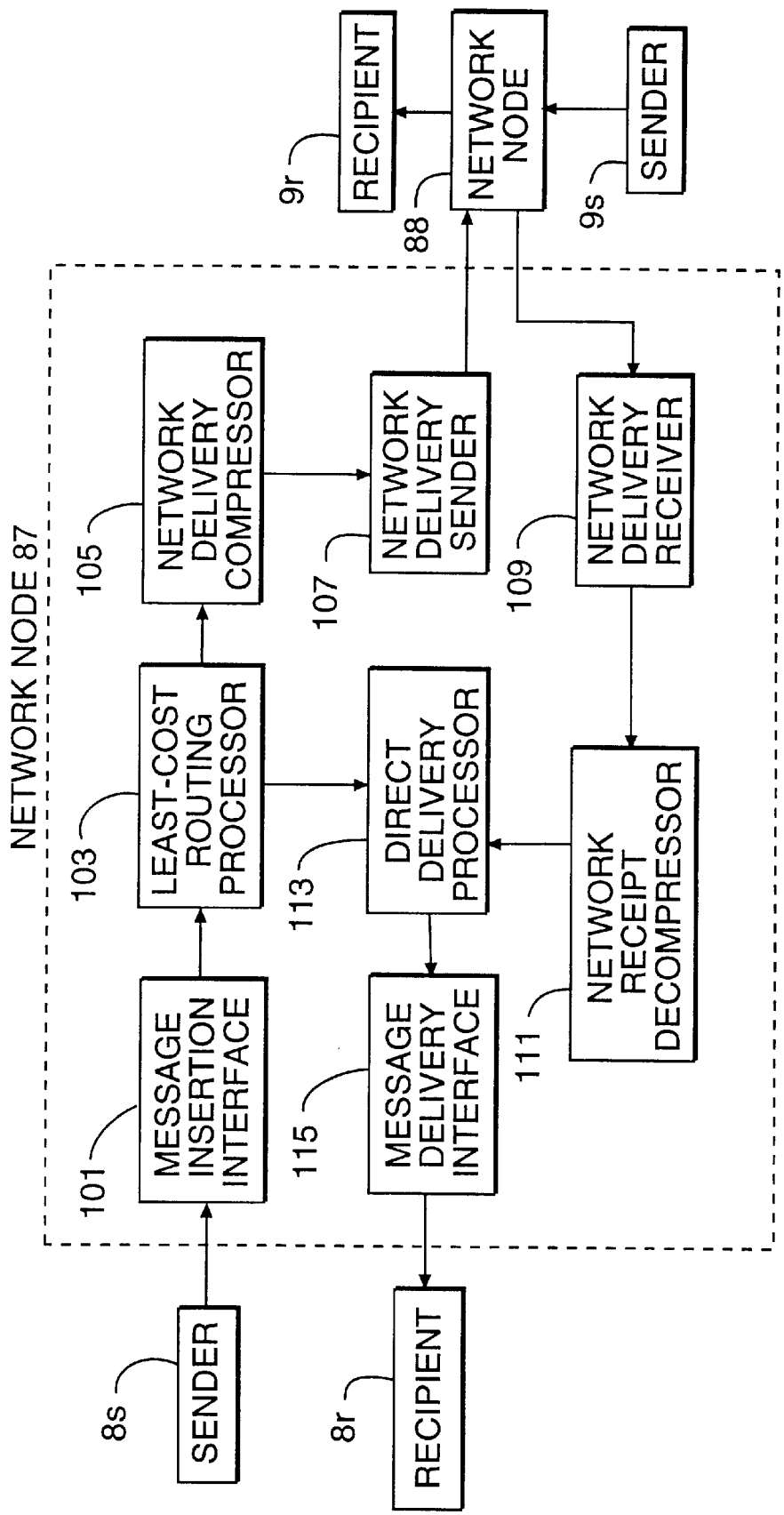
FIG. 7a is a schematic block diagram of a Network Node.

FIG. 7 is a schematic diagram of a preferred embodiment of the present invention. FIG. 7 differs from FIG. 6 primarily by using a generalized representation of PSTN 5, i.e., in FIG. 7 PSTN 5 represents the world-wide telephone network, not the local area telephone networks identified as PSTN 5s and 5r in FIG. 6. FIG. 7 will be described using the paradigm of a facsimile message, but, as discussed above, the present invention could be used with any of a wide variety of message types.

The left side of FIG. 7 identifies means for DEMs to be entered into the PROAD network. MCD is (e.g., a facsimile machine) delivers a facsimile to WAN 6 through PSTN 5, using connections 15 and 16. A facsimile machine "on the network," such as MCD 2s, can also enter a facsimile into WAN 6 through Call Re-router 4, using connections 25 and 26. Call Re-router 4 is a device that listens to the phone number entered by the user of MCD 2s, and, instead of dialing that number directly, dials a phone number to WAN 6. When WAN 6 answers the call, Call Re-router 4 identifies itself and the destination telephone number, and then passes the call back through to MCD 2s so that MCD 2s can deliver the facsimile. Call Re-router 4 can insert messages into the PROAD network through PSTN 5, through connections 26a and 26b, although that is not as efficient. Finally, a Network User 3s can generate a facsimile on a client workstation on the PROAD network, and submit that facsimile directly to WAN 6 for delivery.

The right side of FIG. 7 indicates mechanisms for DEM delivery to recipients. WAN 6 will deliver facsimiles to a typical facsimile machine—MCD 1r —over the PSTN 5 using connections 61 and 51. WAN 6 will also deliver facsimiles, using connection 52, to facsimile machines on the network—MCD 2r—via whatever local telephony is available (e.g., a private branch exchange (PBX) system) allowing MCD 2r to answer. Finally, message recipients can be at client workstations on the network, so WAN 6 must deliver facsimiles to Network User 3r, using connection 53 (in a manner very similar to E-mail delivery).

Figure 8:
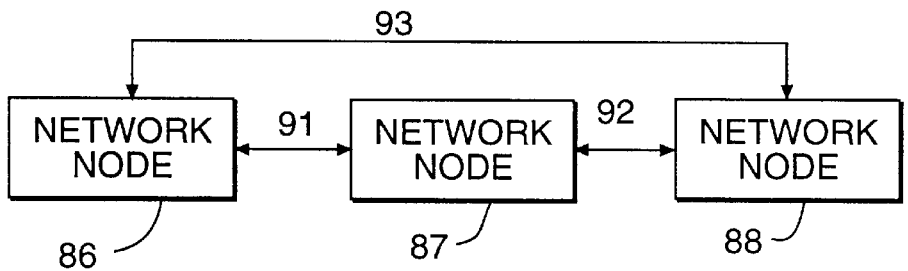
FIG. 8 is an illustrative diagram showing possible connections between network nodes.

FIG. 8 shows Network Nodes 86, 87 and 88 of WAN 6. Network Node 86 is connected to Network Nodes 87 and 88 through connections 91 and 93, respectively. Network Nodes 87 and 88 are connected to one another through connection 92. Of course, WAN 6 can contain any number of nodes (at least 2) and the connections among them can be varied. FIG. 8 merely attempts to show that connections are normally redundant, so that there are at least two paths from each node to each other node.

Two of the primary goals of the present invention are to identify the best routing available so that each DEM is delivered to either network nodes 86, 87 or 88, depending on the characteristics of that node and the location of the recipient (MCD 1r, MCD 2r, or Network User 3r from FIG. 7), and to minimize the network traffic (i.e., character count) of DEMs being transferred over connections 91, 92 and 93.

Input: Input of DEM data into the network at Network Node 86 originates from either MCD 1s, MCD 2s, or Network User 3s, along the following routes:

1. Connections 15 and 16 (FIG. 7) comprise a normal message transmission, using the normal protocol for a particular DEM data type. In this case, Network Node 86 emulates the receiving functionality of MCD 1r, accepts the inbound message, and stores it.

Figure 1:
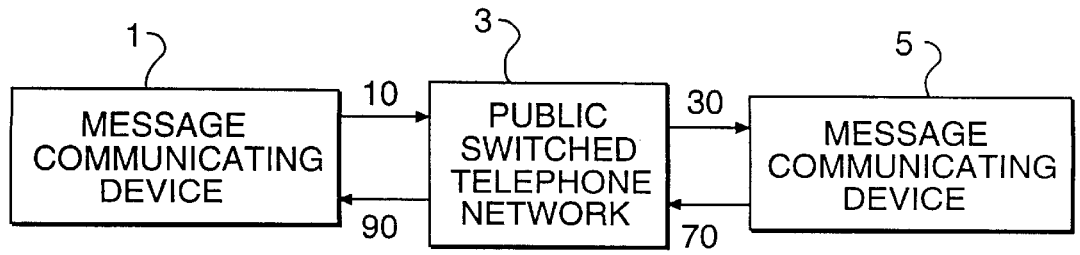
FIG. 1 is a schematic diagram of a prior art message communicating system.
Figure 2:
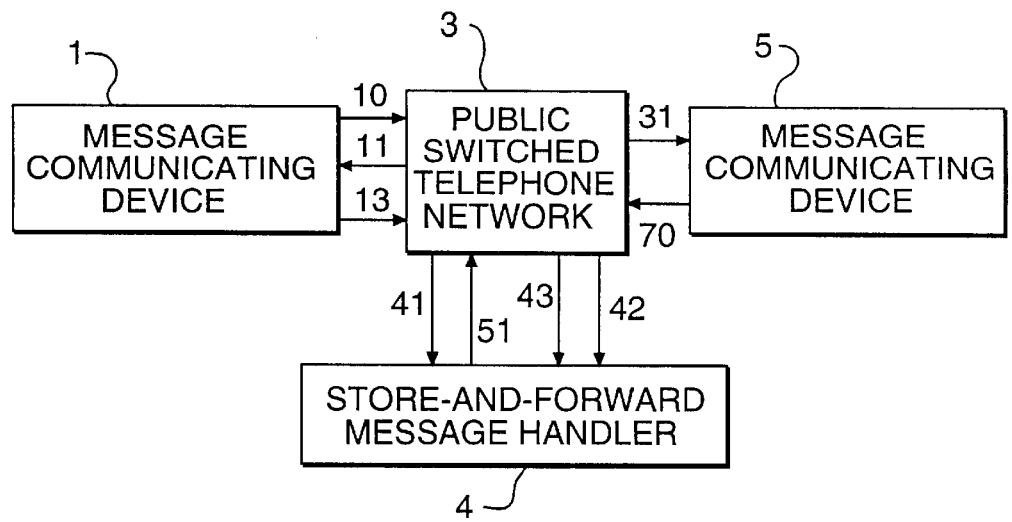
FIG. 2 is a schematic diagram of a prior art message communicating system that utilizes a store-and-forward message handler.
Figure 3:
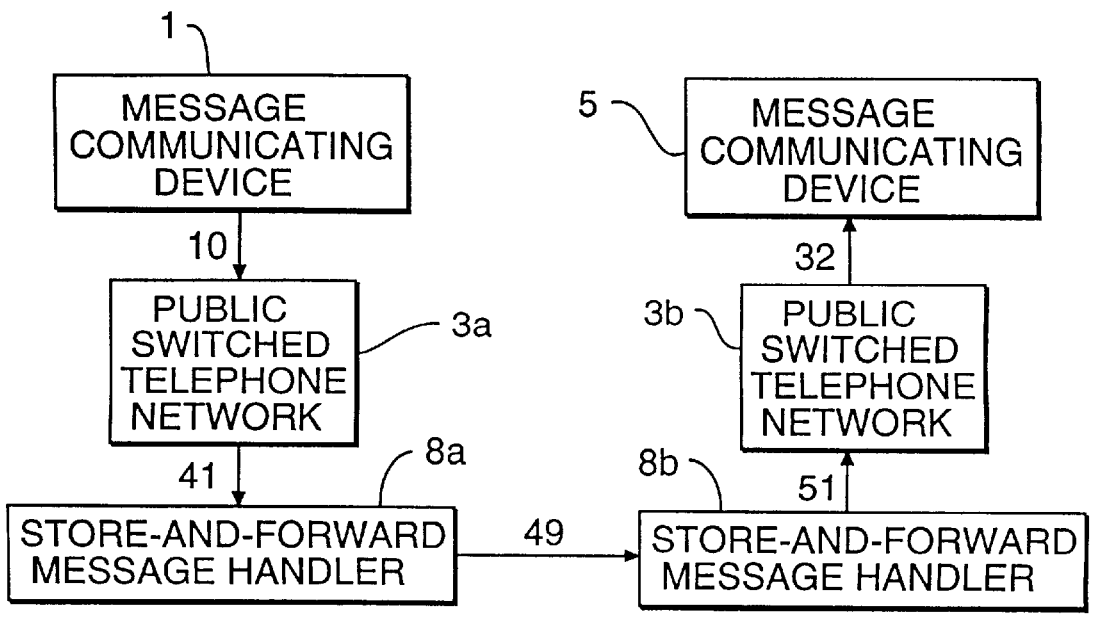
FIG. 3 is a schematic diagram of a prior art message communicating system that utilizes two store-and-forward message handlers.
Figure 4:
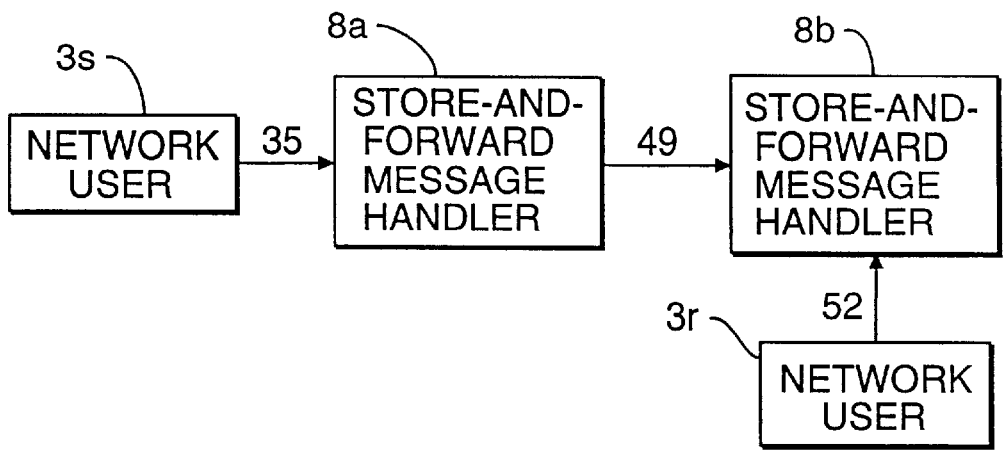
FIG. 4 is a schematic diagram of a typical E-mail system.
Figure 5:
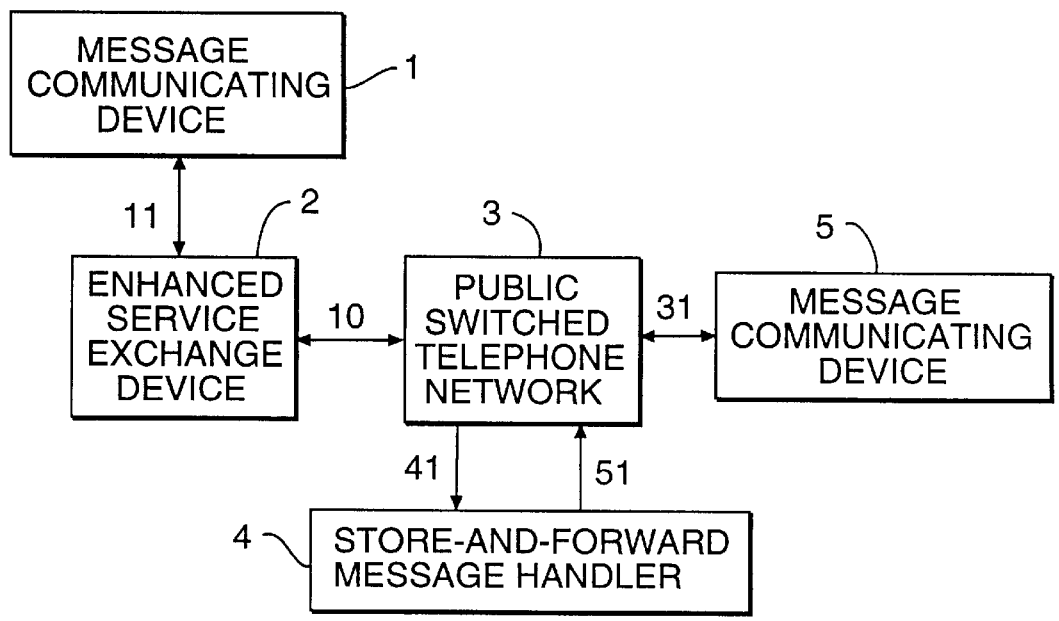
FIG. 5 is a schematic diagram of a prior art system using an enhanced service exchange device.

2. Connections 25, 26a and 26b comprise a normal message transmission, with the insertion of Call Re-router 4 as discussed above in connection with FIG. 5. Again, Network Node 86 accepts the inbound message and stores it.

3. Connections 25 and 26 replicate the connection in the above paragraph, except that the call is made without going through PSTN 5, avoiding any associated phone costs. This connection is most often made through a private branch exchange (PBX). with the appropriate equipment at Network Node 86, this is not necessary.

4. Connection 35 is a typical data network connection, such as a TCP/IP Socket connection.

Stored Format: The DEM data input from routes 1, 2 and 3 is stored in the format used with that specific type of message. In the example of a facsimile transmission, the resulting stored document will typically be in either TIFF, PCX, or DCX format.

The format of the stored DEM data is then optimized for network transmission, possibly dependent on the particular recipient of the message. For example, Postscript and PCL formats are two standard formats for document representation. Standard voice and video formats are available as well. If the recipient is not identified in any manner to indicate special handling, the PROAD can use a predetermined default format, selected from the available standard formats.

The PROAD network makes no assumption as to the standard format that is best for a particular environment, or even for a particular message instance. Again, consider the facsimile example. Under the assumption that the most likely recipient is not a Network User, it would be appropriate to encode the output from the sender in Postscript or PCL. These formats can fully represent the complete document image, and generally require, depending on the message, less storage than TIFF or PCX. The choice of Postscript or PCL may differ based upon how the message was created, or based upon the specific content in the addressed message.

Alternatively, if the message recipient is most likely (or can be determined) to be another Network User, the choice of format may well be one that is readily readable by the recipient. If more than one format is readable by the user, the system will select that readable format which requires the least amount of characters for transmission. For example, if the sender creates a document using the word processing package Microsoft Word for Windows 6.0, and the recipient has the same package, it will often be considered optimal for the sender to generate output in Word for Windows format. However, if it cannot be known if the recipient has the same package, it will often be considered optimal for the sender to generate a more standard text representation format, such as Rich Text Format (RTF). Since most word processing packages can import a document encoded in RTF, this provides a common format for document transmission.

Header Information: Finally, when DEM data is input by Network User 3s, character overhead can be eliminated by pre-storing header information about this specific user that is typically replicated in the output of every message that the user generates. For example, depending on the Postscript driver used, a Postscript header file is generated that maps short-hand codes used in the current message representation to a standard Postscript command set. This mapping will change for the same user only if the user changes the Postscript driver he or she uses. A special driver can be written to eliminate the repetition of this header information in every document generated by Network User 3s.

Routing: The present invention provides a mechanism for determining the best path to the recipient, given that the delivery must be pro-active. The best path is the path that delivers the message in the most cost-efficient manner, given constraints as to the time allowed for delivery, the level of security and privacy required, any specific requirements for delivery equipment or software, and the capacity of the WAN discussed above.

Figure 9:
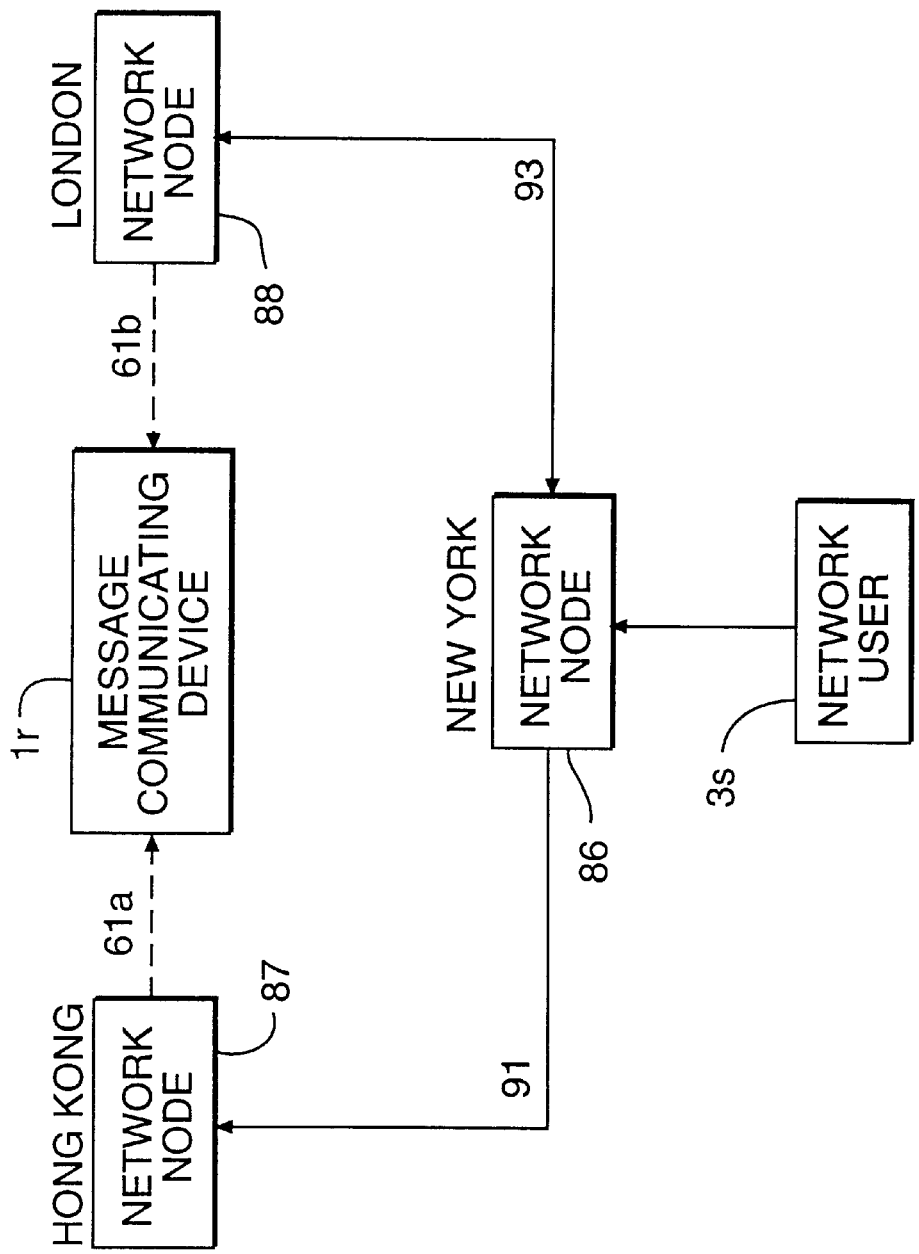
FIG. 9 is an illustrative diagram which serves to illustrate the options available for least-cost routing.

Unless Network Node 86 determines that it is the optimal node for final delivery of the DEM message, inter-nodal transfer will be necessary. FIG. 9 provides an example of a 3-node PROAD network: Network Node 86 is assumed to be in New York City, Network Node 87 in Hong Kong and Network Node 88 in London. This example is relatively simple because Network User 3s is directly connected to Network Node 86. MCD 1r can be reached using either the Hong Kong or the London nodes. Network Node 86 must choose whether the best path to MCD 1r is through Network Node 87 or through Network Node 88.

Basic Algorithm: The first (and in the simplest embodiment of the present invention the only) algorithm to apply is purely a least-cost routing algorithm. Effectively, this becomes a choice of whether telephone call 61a will be less expensive than telephone call 61b (assuming that internodal costs are substantially equal). If internodal costs are not substantially equal, the cost difference can be included in the routing calculations.

The following is an example of the rough algorithm that may be applied:

1. Is there a restriction on the carrier that can be used to make a connection on behalf of MCD 1s? In the U.S., for example, a service bureau might have to honor subscribers' contracts that require all long-distance calls be made through a specific inter-exchange carrier, such as AT&T or MCI. If there is an absolute restriction, the first step is to limit all analyzed node options to those that do not violate this contract. (Alternatively, it may be true that handling by a particular carrier is not an absolute restriction, but that a cost penalty of sorts is assessed whenever such a carrier is used. For example, a company may have a lower-cost contract with MCI, but also have a contract with AT&T. Furthermore, the rates associated with each contract could be modified dynamically. Suppose, for example, that the rates with MCI and AT&T were 16 and 18 cents per minute, respectively. However, AT&T allows a discount to 15 cents per minute after 1000 minutes are used in any one month. The least cost routing table should adapt costs based upon such agreements.)

2. Is there a restriction on the equipment required to process the request? The PROAD network must first assess the requirements for delivery of the particular message content, and then factor in the recipient's receiving capabilities. For example, encryption hardware may be necessary to fulfill the sender's request, and a receiver may require a particular encryption interface that is not available on all nodes. This may further limit the possible set of nodes that are passed on to the cost analysis.

3. Is MCD 1r in a location that can be reached by either Hong Kong or London via a local telephone call, at no cost? If so, that node is the proper choice. Note that in London, every phone call, even local calls, is charged to the caller. As such, if London were the only node in Great Britain, it still cannot be assumed that any call to Great Britain is best delivered via the London node.

4. What is the size of the image that is to be transmitted, and what is the expected rate of image transmission? This calculation yields an expected message transmission time.

5. Is there a difference in the way calls are charged from London and Hong Kong, depending on the duration of the call? For example, a call from Taipei to anywhere in Taiwan is charged at a flat rate, no matter the duration of the call. If a Taipei node were included in this example, and MCD 1r were in southern Taiwan, there would be a question as to whether Hong Kong or Taipei would be the best delivery node. If the call from Taipei to MCD 1r were 20 cents flat rate, and the call from Hong Kong to MCD 1r were 15 cents per 60 seconds, the expected duration of the call could affect the routing decision. A call expected to take one minute or less should be delivered from Hong Kong; all other calls should be delivered from Taipei.

6. Is either of these nodes located in a city which presently charges for telephone calls at off-peak rates? For example, if MCD 1r is in Paris, calls from both Hong Kong and London are charged by the minute, the charge from London to Paris during off-peak hours is $0.50 per minute $1.00 per minute during peak hours, the charge from Hong Kong to Paris during off-peak hours is $0.75 per minute, and off-peak hours start at 6:00 p.m. in London. If the current time is an off-peak time at each location, the London node is the best node for delivery. However, Hong Kong has a 12 hours time difference with New York, while London is 5 hours ahead of New York. Between 9:00 a.m. and 1:00 p.m. in New York, the optimal delivery point is Hong Kong. After 1:00 p.m. in New York time, the optimal delivery point is London.

It is also important in certain case to make routing decisions down to the level of local exchange within an area code or city code, because the call charge differs based on the distance from the network node's point of presence. For example, in Chicago calls are charged based in part upon the distance between the caller and the recipient of the call. Thus two network nodes in the 708 area code may incur significantly different local telephone charges. It is therefore necessary to know more information than simply the recipient's area code. This may be the case for international calls as well, in which the country code and sometimes the city code do not provide enough information to determine the best delivery point.

Inter-Nodal Considerations: Many operators of PROAD networks will factor in the difference between the costs of inter-nodal transfer along connections 91 and 93 to their least-cost routing decisions. For example, if the least cost routing decision favors Hong Kong delivery by 25 cents, this decision can be over-ridden if the cost of delivery along connection 91 is more than 25 cents higher than that along connection 93.

Therefore, the term preferred path routing is used to apply to the entire routing decision. Least cost routing is simply preferred path routing where inter-nodal costs are assumed to be the same regardless of the inter-nodal path.

Other Network Considerations: The cost of a network connection can be affected by many subjective parameters that can be factored into the preferred path routing decision (for example, by assigning costs to certain choices). For example, costs can be assigned to certain network connections, based upon the availability of those connections. Furthermore, the availability of delivery ports at a given site may be limited, while those at another site may be plentiful. This availability may change dynamically during the day. A cost value can be allocated depending upon availability. So, for example, a particular PROAD network provider may determine that a 15-minute delay in delivery is unacceptable, and assign a 25 cent per minute penalty if such a delay is expected. This could have been enough, in the example discussed above with reference to FIG. 9, to change the routing decision from Hong Kong to London.

Furthermore, if the inter-nodal transfer has to pass through multiple nodes in order to reach the final destination, there may be a charge for each network hop. So, although the PROAD network does not differentiate costs along any path (e.g., a flat rate for 100,000 characters transferred between two nodes), if transfer from New York to Hong Kong required an intermediate transfer to Tokyo, the resulting network charge might increase.

Copyright, 1995, Open Port Technology, Inc.

Routing Tables: The following routing table provided as examples of routing tables that accommodate the factors discussed above. Information is provided roughly in terms of SQL data table format (fields with an asterisk are part of the unique key for that table):

```
User_Alias_Table
    User_alias*
    Alias_type*
    User_identification
Call_Information_Table
    Sender_identification*
    Recipient_identification*
    DEM_identification*
    Requested_delivery_timestamp*
    Carrier_requirement_call
    Equipment_requirement_call
    DEM_size
User_Parameter_Table
    User_identification*
    Carrier_requirement_default
    Equipment_requirement_default
Node_Path_Table
    Originating_node_name*
    Terminating_node_name*
    Rate_identifier
Node_Location_Table
    Unique_location_identifier*
    Node_name
    Number_of_ports
    Dynamic_port_availability_factor
    Port_availability_rate_identifier
    Carrier_exclusion
    Equipment_capabilities
    Delivery_speed
Phone_Area_Table
    Node_name*
    Country_code*
    Phone_number_prefix*
    Rate_identifier
Rate_Table
    Rate_identifier*
```

-continued

```
    Minimum_volume*
    Dynamic_current_volume
    Rated_by_TimeorBytesorPercent
    Beginning_timestamp*
    Ending_timestamp*
    Initial_rate
    Initial_length
    Subsequent_rate
    Subsequent_length
```

Rating Algorithm: The algorithm for rating calls would then use rules such as the following:

1. Using the User_Alias_Table, map the User_identification field to the Sender_identification and Recipient_identification fields in the Call_Information_Table, to determine the sender and recipient. This use of alias identifiers is necessary as the number of addresses—E-mail, voice phone number, pager number, facsimile number, etc.—for an individual proliferates. The purpose of this table is to minimize the requirement for all parties involved in a communication to know all the addresses of the other parties. The Recipient_identification at this point will be a real or pseudo phone number. This need not be a viable phone number, in that it is possible that one could not dial it. The only requirement is that its format be assessable through the Phone_Area_Table (see 3 below).

2. If the call was generated requesting specific Carrier_requirement_call or Equipment_requirement_call values, use those values. Otherwise, copy the Carrier_requirement_default and Equipment_requirement_default values from the User_Parameter_Table. Note that the x_call values are a concatenation of the sender's and recipient's defaults in the latter case.

3. Limit the selection set by querying the Node_Location_Table for mis-matches in the Carrier_exclusion and matches in the Equipment_capabilities fields. It may also be possible to limit the selection set further at this point, by mapping the Phone_Area_Table via the Node_name and Recipient_identification fields. The Phone_Area_Table may deliberately exclude calls from particular nodes to particular countries, for example. Generally, for any combination of Country_code and Phone_number_prefix (which may be area code and exchange, city code and exchange, or whatever length would be required for uniqueness of call rating), only 2 or 3 nodes should be assigned as possible delivery points to that location.

4. From the remaining node set, identify the delivery time requirement of the DEM data by taking the DEM_size of the message and applying the Delivery_speed for each node.

5. Rate the cost from the originating node to each of the possible delivery nodes, using the Node_Path_Table, mapped to the Rate_Table via the Rate_identifier field.

6. Rate the cost from the various delivery nodes, factoring in the current usage on those nodes, through the applicable ports. The Dynamic_port_availability_factor is constantly updated, identifying the length of the queue for service on each Unique_location_identifier. The Port_availability_rate_factor is mapped to the Rate_Table—again via the Rate_identifier field—to assess a penalty to the probably delay if the call is routed to that node. This can accommodate different penalties at different times. This factor is particularly important to assess in the case of a message broadcast, where one message is sent to multiple recipients. Then, the current message itself contributes to the Dynamic_port_availability_factor, so the assessment of cost to a recipient at the bottom of a broadcast list can be higher than the assessment of cost to a recipient at the top of a broadcast list. However, two additional factors must be considered.

First, if the only costs that mattered are phone delivery costs, it is advantageous to split up a broadcast list, and deliver one copy of the message with a fragment of the list to a node that will be responsible for that fragment, and so on for all nodes responsible for list fragments.

Second, it is sometimes necessary to get the maximum usage out of ports, regardless of the cost. The impact of the first consideration is that, when inter-nodal transfer costs are then factored in (see step 5), it is important to note that all recipients are sharing the single copy transfer cost.

The second consideration is more complex, because it addresses cases in which expediency over-rides cost. For example, some broadcast messages must be received by all recipients within a certain time frame. This requires a method for over-riding the cost algorithm altogether, which can be accommodated in the sender's request (or more normally, through an administrator's over-ride). It also suggests the need for a method of equalizing the impact across all nodes, so that the Dynamic_port_availability_factor does not become overwhelming at a particular point in the network. See the discussion below on inter-nodal transfer.

7. Rate the cost of the phone call from each delivery node to the recipient. This takes the Rate_identifier as determined in 3 above and maps it to the Rate_Table, and then factors in the Requested_delivery_timestamp—compared to the Beginning_timestamp and Ending_timestamp—and Dynamic_current_volume—compared to the Minimum_volume for a particular rate. The Dynamic_current_volume is constantly updated, so that rates are available with highest volumes are used.

8. The calculations from steps 5, 6 and 7 are summed, and the Unique_location_identifiers are ranked in order of preference. The lowest cost opportunity is identified as the Preferred Delivery Node.

Copyright, 1995, Open Port Technology, Inc.

After the ratings are calculated, an attempt is made to deliver to the message using the highest-rated node, and if that fails, attempts are made going down the ranking list.

The ratings are maintained and passed to the Delivery Node, along with the differential costing of other nodes considered. There could be a delivery problem at the Delivery Node that would require that node to bypass its own delivery mechanism, and forward the message to one of the other nodes in the ranking. This can only be optimized if the current node now factors in step 5 above—the cost of inter-nodal cost transfer.

Inter-nodal Transfer: As Network Nodes 86, 87 and 88 communicate among one another in the PROAD network, transfer character counts are minimized. Connections 91, 92 and 93, shown schematically in FIG. 8, are typically TCP/IP Socket connections or X.25 wide area network connections, or the like. A PROAD network is optimized as the bandwidth required for these connections are minimized.

Regardless of input type, a compression is performed on the input DEM data to minimize inter-nodal transmission time. In the case of TIFF data, for example, a standard compression can be used that does not eliminate any information from the original, and still gains an average 15–20% reduction in the size of the image representation. If the input format is Postscript, the same compression technique gains a 30–35% reduction without losing information.

For environments in which minimal information loss can be tolerated, the character savings can be much more significant. Voice and video applications provide the most likely cases wherein information loss may be acceptable, particularly when the recipient does not have playback capabilities equivalent to the sender's recording capabilities. For example, a broadcast voice message may well be entered by a Network User 3s with sophisticated recording equipment, and delivered to recipients over typical phone lines, to typical telephone headsets. In this case, it would be possible to change the amount of sound information stored prior to inter-nodal transfer, with no perceivable loss in quality by the recipient.

The compression technique can be selected specifically for the type of DEM data being transmitted. For example, a TIFF file will contain particular characteristics that can be anticipated by the compression routine, such that, if the input format is known to be TIFF, additional compression is possible.

Also, in this latter case it is possible for the PROAD network owner to define one or more proprietary compression formats that can be maintained without public knowledge. As such, these formats offer a measure of security such that inter-nodal traffic, even if intercepted by unauthorized persons, will not be readable. For the sender or recipient who are concerned about the potential for such a security breach, other secure mechanisms can be employed. For instance, a DES algorithm could be applied by the sending Network Node 86 based on stored characteristics about the sender, or based on key information provided at the time of sending. Network Node 87 (or 88, whichever is responsible for delivery) can decrypt or authenticate the sender's message based on stored characteristics about the recipient, or based on key information provided at the time of receipt.

Final delivery to the recipient: After the message has reached the Network Node responsible for its final delivery, the message must be delivered. If the recipient is Network User 3r, the delivery mechanism is parallel to that used by prior art E-mail systems. The user may be notified through a computer screen pop-up message, for instance, that a message has been received at that node on the user's behalf, and is ready for viewing. If the format of the message is such that the recipient can edit or forward the message readily, the final delivery node presents the message to the recipient accordingly.

Privacy: In the case where the recipient is Network User 3r, privacy is assured since only that user can retrieve the message. Some measure of privacy is also provided to recipients MCD 1r and 2r. The Network Node 87 or 88, which is charged with delivering the message, can, instead of delivering the message directly, provide another proactive means (e.g., pager, voice message, facsimile) for notifying the user of MCD 1r or MCD 2r that a message is waiting to be picked up. The user can then initiate the connection to the Network Node, thus assuring privacy.

Segmentation of Broadcast Messages: For the case of a broadcast message, when all available ports must be used, regardless of cost, for delivery to all recipients within the shortest time span possible, the segmentation of the list of recipients will not necessarily correspond to the preferred path routing. More importantly, it requires a queuing mechanism that withholds the onset of delivery until all available ports can be used effectively. For example, consider that one node has 24 ports available for delivery. If the queuing mechanism for those ports is sequential, and it takes 5 seconds to process the message preparation, there is a 115 second difference between the time the first message is begun on the first port and the time the 24th message is begun on the 24th port. The present invention accommodates this scenario by processing all aspects of message preparation prior to the call, and then submits messages to the ports simultaneously.

Administration: Finally, the present invention includes a means of disseminating information that facilities the decision-making required in the previous discussion, as well as intra-network information sharing among network users. For decision-making purposes, tabular information is maintained at every node (or at a centralized hub node, if that architecture suits a particular network configuration better) that (a) allows each node to make the appropriate message conversion and compression decisions to map the output of the sender with the receiving capabilities of the recipient, and then (b) allows each node to make the proper preferred path routing decision.

The mapping of message format from sender to receiver is continually updated by the addition or deletion of capabilities of senders and receivers. This information is updated at the local node to which Network Users $3s$ and $3r$ would be connected, and can be updated at any node for known users of MCDs $1s$, $2s$, $1r$ and $2r$. The updated information is propagated to each node either immediately after the updated information is entered, or on a timed, periodic basis (e.g., nightly).

Much of the data used for making the routing decisions is relatively static data, such as phone rates and the identification of peak and off-peak hours, that does not need to be continuously updated. The central data base can be updated as soon the new data is received, and the updated data can be propagated throughout the PROAD network as soon as it is entered, or it can be propagated periodically. However, dynamic changes to the characteristics of the network are immediately and automatically propagated.

The updated information is disseminated through a connection such as a TCP/IP Socket, using a proprietary protocol for administrative message content, over links 91, 92, and 93 as shown in FIG. 8. Inasmuch as one PROAD network provider may wish to open access to its network to external nodes, the proprietary nature of this administrative message content is necessary.

With respect to information delivered to network users, the present invention provides routing information to allow senders the opportunity to interact with the pro-active delivery decisions that are made. Static information, such as recipient equipment requirements, can be shared to allow senders to adjust their message content accordingly. Dynamic information, such as status values, are delivered back to the sender upon significant event occurrence or upon the sender's request. The sender can thus be notified of the Network Node responsible for the delivery of his or her message, and can adjust accordingly if necessary, perhaps even to the point of sending out a request for deletion of a message delivery. Similar status information can be delivered back to an administrator, of course, so that problems with the delivery mechanisms (e.g., when counter-intuitive routing decisions are made) can be corrected.

Accounting: The present invention also includes an accounting service, which ensures that the sender is properly charged for the delivery of his DEMs. All the information related to transmitting a message, such as the identities of the sender and the recipient, the intra-network handling of messages, and the specifics and cost of the delivery, is retained by the system. The owner of the system therefore has multiple options as to how to bill the users of the system. For example, the sender can be identified by the sender's network user name and/or billing codes. The recipient can be identified by the recipient's address, network user name (if appropriate), billing codes, or any combination thereof.

The system can also track the inter-network handling of the DEMs, i.e., it can record each "hop" between nodes on the network, the number of characters transmitted and any rate-identifying information. It can also track final delivery information such as the size of the message (or the number of facsimile pages delivered), the duration of the delivery, and any rate identifying information. The system can collect this information to assign the costs for each transaction, regardless of who the sender and the recipient are.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for transmitting a facsimile message using a computer network, comprising:

a sender facsimile machine to create the facsimile message;

a network node on the computer network which receives the facsimile message;

a memory on said network node which stores the facsimile message;

a least-cost routing process to determine a destination node to which to send the facsimile message in accordance with a least cost;

a delivery process to deliver the facsimile message to the destination node; and a receiver facsimile machine which receives the facsimile message from the destination node;

wherein said network node comprises an encryption process to encrypt the facsimile message, and wherein said least-cost routing process comprises a process to determine the destination node in accordance with the encryption.

2. A method for transmitting a facsimile message over a computer network, comprising the steps of:

(a) creating the facsimile message;

(b) sending the facsimile message to a network node;

(c) storing the facsimile message in the network node;

(d) least-cost routing the facsimile message to a destination node;

(e) receiving the facsimile message from the destination node;

(f) encrypting the facsimile message; and (g) determining the destination node in accordance with the encryption.

3. A system for transmitting a document, comprising:

a computer on which a network user creates the document;

a network node which receives the document from the computer;

a memory on said network node for storing the document;

a least-cost routing process to determine a destination node to receive the document according to a least cost;

a network delivery process to deliver the document to the destination node; and a receiver facsimile machine to receive the document from the destination node; and wherein said network node comprises an encryption process to encrypt the facsimile message, and wherein said least-cost routing process comprises a process to determine the destination node in accordance with the encryption.

4. A method for transmitting a document, comprising the steps of:

(a) creating the document on a computer network;

(b) receiving the document;

(c) least-cost routine the document to a destination node;

(d) receiving the facsimile representation from the destination node;

(e) encrypting the facsimile message; and (f) determining the destination node in accordance with the encryption.

5. A system for transmitting a facsimile message, comprising:

a sender facsimile machine to create the facsimile message;

a network node on a computer network to receive the facsimile message and a recipient address;

a memory on said network node for storing the facsimile message;

a mapping process to map the recipient address to a corresponding network address on the computer network; and a network delivery process to deliver the facsimile message to the network address according to a least-cost route, wherein said network node comprises an encryption process to encrypt the facsimile message, and wherein said least-cost routing process comprises a process to determine the destination node in accordance with the encryption.

6. A method for transmitting a facsimile message, comprising:

(a) creating the facsimile message;

(b) sending the facsimile message and a recipient network address to a network node on a computer network;

(c) storing the facsimile message;

(d) mapping the recipient address to a corresponding network address on the computer network;

(e) delivering the facsimile message to the network address according to a least-cost route;

(f) encrypting the facsimile message; and (g) determining the destination node in accordance with the encryption.

7. A system for transmitting a document representing facsimile data from a computer to a network user, comprising:

a computer on which the document to be sent to a facsimile machine phone number is created;

a network node on a computer network for receiving the document and the facsimile machine phone number from said computer;

a memory on said network for storing said document;

a mapping process to map said facsimile machine phone number to a network address on the computer network;

a process to convert the document to a facsimile representation; and a network delivery process to deliver the facsimile message to the network address according to a least-cost route, wherein said network node comprises an encryption process to encrypt the facsimile message, further comprising a process to determine the destination node in accordance with the encryption.

8. A method for transmitting a document representing facsimile data from a computer to a network user, comprising:

creating a document to be sent to a facsimile machine phone number on a computer;

sending the document and the facsimile machine phone number to a network node on a computer network;

storing said document;

mapping said facsimile machine phone number to a network address on the computer network;

delivering the facsimile message to the network address according to a least-cost route;

encrypting the facsimile message; and determining the destination node in accordance with said encryption.

9. A system for transmitting a facsimile message in a cost-effective manner using a computer network, comprising:

(a) a facsimile machine to create the facsimile message;

(b) a network node on the computer network to receive the facsimile message;

(c) a least-cost routing process to determine a destination node on the computer network to which to send the facsimile message so that it reaches an intended recipient according to a least cost; and (d) a network delivery process to send the facsimile message to the destination node, wherein the least-cost routing process comprises:

a first route selection process to select a plurality of routes for transmitting the facsimile message from the first facsimile machine to the second facsimile machine;

a rating process to rate each route of said plurality of routes to determine a cost value for each route;

a rating table creation process to create a table of said plurality of routes, wherein each route is ranked according to its cost value; and a second route selection process to select the highest ranking route from the table; and wherein said destination node comprises:

a transmission process to transmit the facsimile message to a destination node associated with the highest ranking route.

* * * * *